(12) United States Patent
Chen et al.

(10) Patent No.: US 11,128,009 B2
(45) Date of Patent: Sep. 21, 2021

(54) BATTERY BOX

(71) Applicant: CONTEMPORARY AMPEREX TECHNOLOGY CO., LIMITED, Ningde (CN)

(72) Inventors: Tianming Chen, Ningde (CN); Zhiming Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 142 days.

(21) Appl. No.: 16/673,546

(22) Filed: Nov. 4, 2019

(65) Prior Publication Data

US 2020/0212391 A1 Jul. 2, 2020

(30) Foreign Application Priority Data

Dec. 29, 2018 (CN) .......................... 201811652946.0

(51) Int. Cl.
*H01M 50/20* (2021.01)
*H01M 50/10* (2021.01)
(Continued)

(52) U.S. Cl.
CPC ........... *H01M 50/20* (2021.01); *H01M 50/10* (2021.01); *H01M 50/116* (2021.01);
(Continued)

(58) Field of Classification Search
None
See application file for complete search history.

(56) References Cited

U.S. PATENT DOCUMENTS

2010/0136413 A1 6/2010 Hermann et al.

FOREIGN PATENT DOCUMENTS

| CN | 105762316 A | 7/2016 |
|---|---|---|
| CN | 206003860 U | 3/2017 |

(Continued)

OTHER PUBLICATIONS

Contemporary Amperex Technology Co., Limited, Extended European Search Report EP19207855.8, dated May 20, 2020, 7 pgs.

(Continued)

*Primary Examiner* — Sarah A. Slifka
(74) *Attorney, Agent, or Firm* — Morgan, Lewis & Bockius LLP

(57) ABSTRACT

The present disclosure provides a battery box, the battery box comprises a box body, batteries, an insulating film and an adhesive. Each battery comprises a case. The insulating film covers the case of each battery and is provided with an opening. The adhesive is provided between the battery and the box body. The $\sigma_1$, $\sigma_2$, $A_1$ and A meet a following relationship $$\frac{A-A_1}{A}\cdot\sigma_2 + \frac{A_1}{A}\cdot\sigma_1 \geq 7.2\ Mpa.$$

The insulating film ensures the insulation performance, and because the insulating film is provided with the opening, a portion of the adhesive bonds the case to the box body at the opening, a portion of the adhesive bonds the insulating film to the box body at the outside of the opening, therefore the bonding strength between the battery and the box body is improved, thereby improving the overall strength. Moreover, because $\sigma_1$, $\sigma_2$, $A_1$ and A meet the above relationship, the battery box ensures the safety performance.

20 Claims, 2 Drawing Sheets

(51) Int. Cl.
  *H01M 50/116* (2021.01)
  *H01M 50/147* (2021.01)
  *H01M 50/155* (2021.01)
  *B60L 50/60* (2019.01)

(52) U.S. Cl.
  CPC ....... *H01M 50/147* (2021.01); *H01M 50/155* (2021.01); *B60L 50/66* (2019.02)

(56) References Cited

FOREIGN PATENT DOCUMENTS

| CN | 208622878 U | 3/2019 |
|---|---|---|
| DE | 102013204670 B3 | 5/2014 |
| DE | 102014211821 A1 | 12/2015 |

OTHER PUBLICATIONS

Contemporary Amperex Technology Co., Limited, First Office Action, CN201811652946.0, dated Sep. 14, 2020, 7 pgs.

BATTERY BOX

CROSS-REFERENCE TO RELATED APPLICATIONS

The present application claims priority to Chinese patent application No. CN201811652946.0, filed on Dec. 29, 2018, which is incorporated herein by reference in its entirety.

FIELD OF THE PRESENT DISCLOSURE

The present disclosure relates to the field of battery technology, and particularly relates to a battery box and a vehicle.

BACKGROUND OF THE PRESENT DISCLOSURE

At present, in many battery boxes, the bottom of the battery is directly fixed on the lower box body of the battery box by the manner of bonding. Because the lower box body and the case of the battery are usually made of metal (such as aluminum), and in order to insulate the case of the battery, an insulating film generally covers the case. However, because the insulating film is usually made of a high polymer material such as PET, PC etc., and the surface energy of these high polymer materials are relatively lower, when the lower box body is bonded to the insulating film outside of the case of the battery by the adhesive, the bonding effect is not good.

SUMMARY OF THE PRESENT DISCLOSURE

In view of the problem existing in the background, an object of the present disclosure is to provide a battery box and a vehicle, the battery box ensures the insulation performance of the battery box, meanwhile improves the bonding strength of the battery box, in turn effectively ensures the safety performance of the battery box.

In order to achieve the above object, in a first aspect, the present disclosure provides a battery box, which comprises a box body, a plurality of batteries, an insulating film and an adhesive. The plurality of batteries is arranged side by side in a longitudinal direction and accommodated in the box body, and each battery comprises a case. The insulating film covers and is fixed to an outside of the case of each battery, and an opening is provided on the insulating film to make a corresponding portion of the case expose to the insulating film. The adhesive is provided between the battery and the box body and used to fix each battery to the box body. A bonding strength of the case of the battery bonded to the box body by the adhesive is $\sigma_1$, a bonding strength of the insulating film bonded to the box body by the adhesive is $\sigma_2$, an area of the opening of the insulating film is $A_1$, a total area of a surface of the case on a side corresponding to the opening is A, and $\sigma_1$, $\sigma_2$, $A_1$ and A meet a following relationship:

$$\frac{A-A_1}{A} \cdot \sigma_2 + \frac{A_1}{A} \cdot \sigma_1 \geq 7.2 \ Mpa.$$

In an embodiment, $$\frac{A-A_1}{A} \cdot \sigma_2 + \frac{A_1}{A} \cdot \sigma_1 \geq 7.7 \ Mpa.$$

In an embodiment, $A_1$ and A need to meet the relationship: $A_1/A > 50\%$.

In an embodiment, $A_1/A \leq 70\%$.

In an embodiment, the insulating film is made of polypropylene, polycarbonate or polyethylene terephthalate, and the bonding strength of the insulating film bonded to the box body by the adhesive $\sigma_2$ is no more than 1.8 Mpa. Moreover, the case of the battery is made of aluminum, and the bonding strength of the case of the battery bonded to the box body by the adhesive $\sigma_1$ is no less than 9 Mpa.

In an embodiment, the material of the adhesive is a one-component polyurethane or a two-component polyurethane.

In an embodiment, the material of the adhesive is a one-component epoxy resin or a two-component epoxy resin.

In an embodiment, the case of each battery comprises a bottom face. The opening is positioned below the bottom face of the case in an up-down direction and makes a part of the bottom face of the case expose to the insulating film.

In an embodiment, the case of each battery comprises a side face. The opening is positioned outside the side face of the case in a transversal direction and makes a part of the side face of the case expose to the insulating film.

In a second aspect, the present disclosure further provides a vehicle, which comprises the battery box described above.

The present disclosure has the following beneficial effects: the insulating film covering the outside of the case of the battery ensures the insulation performance of the battery box, and because the insulating film is provided with the opening, a portion of the adhesive bonds the case of the battery to the box body at the opening, a portion of the adhesive bonds the insulating film to the box body at the outside of the opening, therefore the bonding strength between the battery and the box body is improved, thereby improving the overall strength of the battery box. Moreover, because $\sigma_1$, $\sigma_2$, $A_1$ and A of the battery box meet the above relationship, the battery box of present disclosure can resist mechanical impact and does not make the bonding fail in the national GB/T 31467.3 mechanical impact test, thereby ensuring the safety performance of the battery box.

Figure 1:
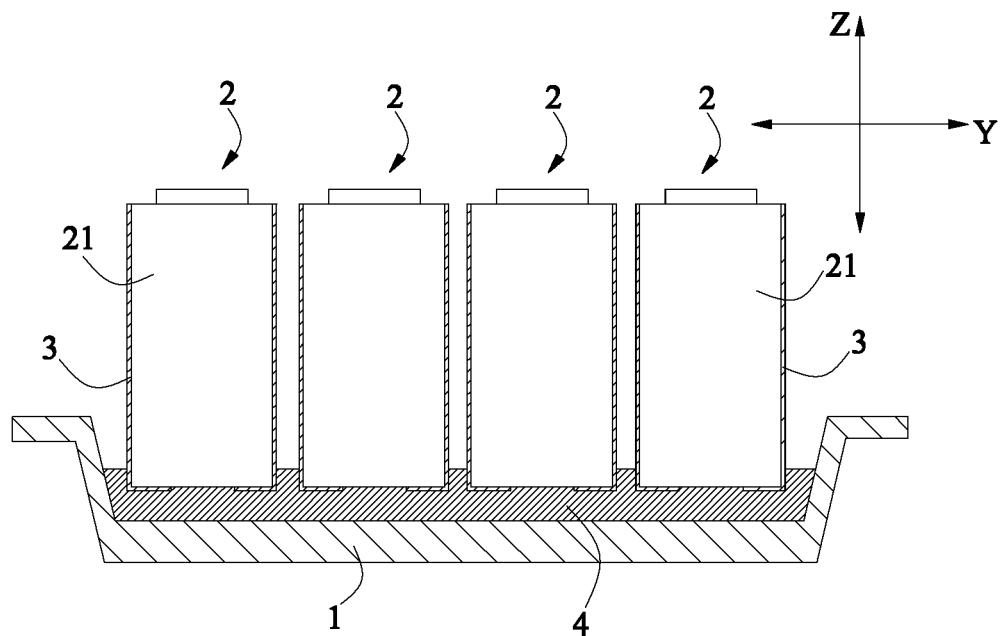
FIG. 1 is a schematic view showing the structure of a battery box of the present disclosure.

Reference numerals in figures are represented as follows:
1 box body
2 battery
21 case
3 insulating film
31 opening
4 adhesive
X transversal direction
Y longitudinal direction
Z up-down direction

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the term "plurality" is two or more. For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present application will be further described in detail in combination with the figures.

Referring to FIG. 1, a vehicle according to the present disclosure comprises a battery box, and the battery box comprises a box body 1, a plurality of batteries 2, an insulating film 3 and an adhesive 4.

The plurality of batteries 2 are arranged side by side in a longitudinal direction Y and are accommodated in the box body 1. Each battery 2 comprises a case 21, and the case 21 comprises two side faces in a transversal direction X, two large faces in the longitudinal direction Y and one bottom face in an up-down direction Z. The case 21 may be made of a metal material.

Figure 2:
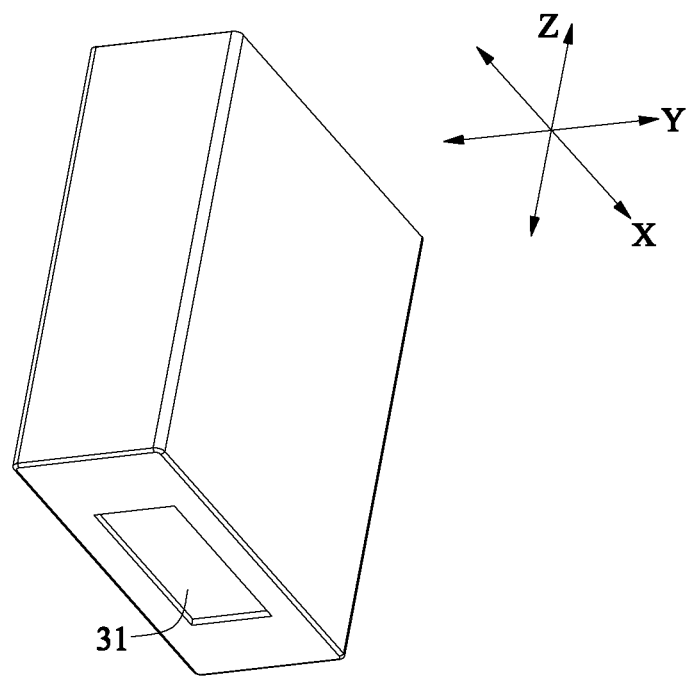
FIG. 2 is a schematic view showing a position of an opening of an insulating film and a battery of FIG. 1.
Figure 3:
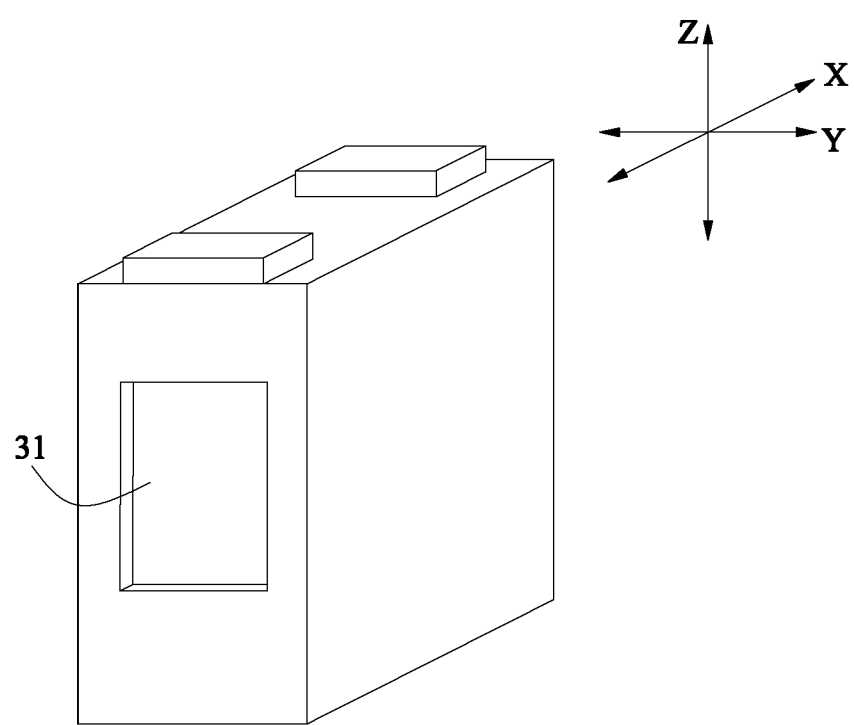
FIG. 3 is a variation of FIG. 2.

A bonding binder is provided on one side of the insulating film 3 facing the battery 2, so as to make the insulating film 3 cover and bond to an outside of the case 21 of the battery 2. An opening 31 is provided on the insulating film 3, so as to make a corresponding portion of the case 21 expose to the insulating film 3. Specifically, the opening 31 may penetrate a portion of the insulating film 3 covering the bottom face of the case 21 of the battery 2 in the up-down direction Z (i.e., the opening 31 is positioned below the bottom face of the case 21), so as to make a part of the bottom face of the case 21 expose to the insulating film 3 (as shown in FIG. 2). Alternatively, the opening 31 may also penetrate a portion of the insulating film 3 covering the side face of the case 21 of the battery 2 in the transversal direction X (i.e., the opening 31 is positioned outside the side face of the case 21), so as to make a part of the side face of the case 21 expose to the insulating film 3 (as shown in FIG. 3).

The adhesive 4 is provided between the battery 2 and the box body 1 and is used to fix each battery 2 to the box body 1. After the plurality of batteries 2 are placed in the box body 1, a portion of the adhesive 4 is positioned between the insulating film 3 and the box body 1, and a portion of the adhesive 4 is positioned between the case 21 of the battery 2 and the box body 1 (i.e., the opening 31 is filled with the adhesive 4). Of course, a portion of the adhesive 4 may also be interposed between the two adjacent batteries 2.

After the battery box is assembled, the case 21 of each battery 2 is bonded to the box body 1 by the adhesive 4, and the insulating film 3 is also bonded to the box body 1 by the adhesive 4, thereby fixing each battery 2 in the box body 1.

In the battery box of the present disclosure, a bonding strength of the case 21 of the battery 2 bonded to the box body 1 by the adhesive 4 is $\sigma_1$ (a unit is Mpa), a bonding strength of the insulating film 3 bonded to the box body 1 by the adhesive 4 is $\sigma_2$ (a unit is Mpa), an area of the opening 31 of the insulating film 3 is $A_1$ (a unit is mm$^2$), a total area of a surface of the case 21 on a side corresponding to the opening 31 is A (a unit is mm$^2$), and $\sigma_1$, $\sigma_2$, $A_1$ and A meet a following relationship:

$$\frac{A-A_1}{A} \cdot \sigma_2 + \frac{A_1}{A} \cdot \sigma_1 \geq 7.2 \ Mpa. \tag{1}$$

The insulating film 3 covering the outside of the case 21 of the battery 2 ensures the insulation performance of the battery box, and because the insulating film 3 is provided with the opening 31, a portion of the adhesive 4 bonds the case 21 of the battery 2 to the box body 1 at the opening 31, a portion of the adhesive 4 bonds the insulating film 3 to the box body 1 at the outside of the opening 31, therefore the bonding strength between the battery 2 and the box body 1 is improved, thereby improving the overall strength of the battery box. Moreover, because $\sigma_1$, $\sigma_2$, $A_1$ and A of the battery box meet the above relationship, the battery box of present disclosure can resist mechanical impact and does not make the bonding fail (i.e., the battery box of the present disclosure can smoothly pass the mechanical impact test) in the national GB/T 31467.3 mechanical impact test, thereby ensuring the safety performance of the battery box.

For the relationship (1), let $$T = \frac{A-A_1}{A} \cdot \sigma_2 + \frac{A_1}{A} \cdot \sigma_1,$$

that is T≥7.2 Mpa. It should be noted that, the larger the value of T is, the greater the bonding strength of the battery box is, and in order to meet the higher requirement of the bonding strength, it can reasonably set the values of $\sigma_1$, $\sigma_2$, $A_1$ and A by the relationship (1) to increase the value of T, in turn attain the purpose of further improving the safety performance of the battery box, greatly reduce the cost of design and improve the production efficiency. Specifically, T≥7.7 Mpa, that is $$\frac{A-A_1}{A} \cdot \sigma_2 + \frac{A_1}{A} \cdot \sigma_1 \geq 7.7 \ Mpa.$$

The bonding strength of the case 21 of the battery 2 bonded to the box body 1 by the adhesive 4 $\sigma_1$ is related to an amount of the adhesive 4, and the amount of the adhesive 4 is related to the area $A_1$ of the opening 31 of the insulating film 3, thus in order to ensure the requirement of the bonding strength of the battery box, $A_1$ and A need to meet the relationship: $A_1/A > 50\%$.

Meanwhile, because of the structure of the battery 2 itself (i.e., rounded corners are formed at the four corners of the bottom of the battery 2), when the area $A_1$ of the opening 31 of the insulating film 3 is too large, the risk of insulation failure between the rounded corners of the two adjacent batteries 2 is increased. Therefore, in order to reduce the risk of insulation failure of the battery 2, preferably, $A_1$ and A need to meet the relationship: $A_1/A \leq 70\%$.

In the battery box of the present disclosure, the insulating film 3 may be made of a high polymer material such as polypropylene (abbreviated as PP), polycarbonate (abbreviated as PC) or polyethylene terephthalate (abbreviated as PET). At this time, the insulating film 3 is limited by its own material, the bonding strength of the insulating film 3 bonded to the box body 1 by the adhesive 4 $\sigma_2$ is no more than 1.8 Mpa (that is $\sigma_2$, ≤1.8 Mpa).

In one embodiment, the case 21 of the battery 2 may be made of aluminum, and the bonding strength of the case 21 of the battery 2 bonded to the box body 1 by the adhesive 4 $\sigma_1$ is no less than 9 Mpa (that is $\sigma_1 \geq 9$ Mpa). Of course, the case 21 of the battery 2 may also be made of steel, and the bonding strength of the case 21 of the battery 2 bonded to the box body 1 by the adhesive 4 $\sigma_1$ is larger (compared with the case 21 of the battery 2 made of aluminum), therefore the value of T is larger when the values of $\sigma_2$, $A_1$, A of the case 21 made of steel are correspondingly equal to the values of $\sigma_2$, $A_1$, A of the case 21 made of aluminum, thereby making the bonding strength of the battery box higher.

In order to ensure the bonding strength between the adhesive 4 and the case 21 of the battery 2 and the bonding strength between the adhesive 4 and the insulating film 3, in one embodiment, the material of the adhesive 4 may be a one-component polyurethane or a two-component polyurethane.

For the adhesive 4 made of the one-component polyurethane, the bonding strength can be achieved by moisture curing or heat curing. For the adhesive 4 made of the two-component polyurethane, the bonding strength can be achieved by chemical bond and intermolecular force, and the bonding principle of the two-component polyurethane is specifically described below. The two-component polyurethane includes a component containing the —NCO group (such as single-isocyanate or multi-isocyanate) and a polyol-component containing the —OH group, and the component containing the —NCO group and the polyol-component containing the —OH group form the two-component polyurethane under a catalyst. The curing manner of the two-component polyurethane is as follows:

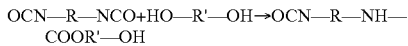

The intermolecular force of the two-component polyurethane refers to a van der waals force formed between molecules, a hydrogen bond formed between a substrate (the substrate comprises the case 21 of the battery 2 and the insulating film 3) and the cured —NH— group, or a hydrogen bond formed between the substrate and the cured —OH group. The chemical bond refers to a covalent bond formed among the OCN—R—NCO not cured into the crosslinked network, a trace water on the surface of the substrate and the metal oxide. Moreover, in achieving the bonding strength of the adhesive 4, the intermolecular force of the two-component polyurethane plays a major role, and the chemical bond plays an auxiliary role.

In addition, it should be noted that, in the preparing process of the two-component polyurethane, the following two aspects should be noted: (1) because a part of —NCO can be consumed when it reacts with water and generates an urea group, the content of —NCO should be higher than the content of —OH; (2) although the higher the content of —NCO is, the more intermetallic covalents are formed, the better the bonding strength is, however when the content of —NCO is too high, the adhesive may be excessively hardened and become brittle, or even the state the colloid is not cured occurs. Therefore, a molar ratio between —NCO and —OH needs to be maintained within a certain range in the preparing process of the two-component polyurethane.

In order to ensure the bonding strength between the adhesive 4 and the case 21 of the battery 2 and the bonding strength between the adhesive 4 and the insulating film 3, in another embodiment, the material of the adhesive 4 may be a one-component epoxy resin or a two-component epoxy resin.

For the adhesive 4 made of the one-component epoxy resin, the bonding strength can be achieved by moisture curing or heat curing. For the adhesive 4 made of the two-component epoxy resin, the bonding strength can be achieved by chemical bond and intermolecular force, and the bonding principle of the two-component epoxy resin is specifically described below.

The two-component epoxy resin includes a component containing an epoxy group and a component containing the —OH group and the —NH$_2$ group, and the component containing an epoxy group and the component containing the —OH group and the —NH$_2$ group form the two-component epoxy resin under a catalyst. The curing manner of the two-component epoxy resin is as follows:

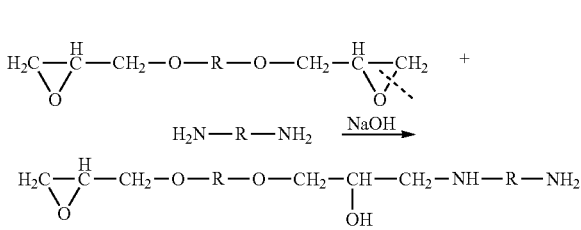

The intermolecular force of the two-component epoxy resin refers to a van der waals force formed between molecules, a hydrogen bond formed between the substrate and the epoxy group, a hydrogen bond formed between the substrate and the —OH group, a hydrogen bond formed between the substrate and the —NH$_2$ group, or a hydrogen bond formed between the substrate and the —O-ether group. The chemical bond refers to a covalent bond formed by the component containing the —NH$_2$ group and a trace water on the surface of the substrate and the metal oxide, and a covalent bond formed by the component containing the epoxy group and a trace water on the surface of the substrate and the metal oxide during the ring opening process.

It should be noted that, because the molecules of the epoxy resin may be an additive reaction in the process of crosslinking, water and volatile product will not be generated, the overall curing shrinkage rate is low, the bulk strength is high, thereby achieving a strong bonding strength.

In order to verify that whether the safety performance of battery box of the present disclosure satisfied the requirements, the battery box was subjected to a mechanical impact test in accordance with the requirements of the mechanical impact test of the 7.2 section of the national standard GB/T 31467.3, (i.e., applied a 25 g, 15 ms half sinusoidal impact waveform on the battery box, impacted three times in the z-axis direction, and observed 2 h), and the corresponding test results was obtained.

In the mechanical impact test, there were 15 test groups respectively formed by three adhesives 4 made of epoxy resin (defined as 1#, 2#, 3#) and the five area ratios of the opening 31 of the insulating films 3, each test group was performed the mechanical shock test, and the corresponding values of $\sigma_1$, $\sigma_2$ in different test groups were as the following Table S-1:

TABLE S-1

| test group | $\sigma_2$ | $\sigma_1$ |
|---|---|---|
| 1-1 | 1.52 MPa | 11.3 MPa |
| 1-2 | 1.64 MPa | 12.3 MPa |
| 1-3 | 1.49 MPa | 11.8 MPa |
| 1-4 | 1.45 MPa | 12.3 MPa |
| 1-5 | 1.61 MPa | 11.65 MPa |
| 2-1 | 1.55 MPa | 9.69 MPa |
| 2-2 | 1.54 MPa | 9.54 MPa |
| 2-3 | 1.53 MPa | 9.66 MPa |
| 2-4 | 1.66 MPa | 9.71 MPa |
| 2-5 | 1.45 MPa | 9.36 MPa |
| 3-1 | 1.44 MPa | 6.78 MPa |
| 3-2 | 1.46 MPa | 7.12 MPa |
| 3-3 | 1.61 MPa | 7.02 MPa |
| 3-4 | 1.56 MPa | 6.98 MPa |
| 3-5 | 1.54 MPa | 6.87 MPa | the values of $\sigma_1$, $\sigma_2$ in different test groups

The test results obtained by the fifteen test groups in the above Table S-1 were shown in the following Table S-2.

TABLE S-2

The test results of 15 test groups

| test group | | $A_1/A$ | the state of battery box |
|---|---|---|---|
| 1# adhesive | 1-1 | 50% | failure |
| | 1-2 | 60% | pass |
| | 1-3 | 70% | pass |
| | 1-4 | 80% | pass |
| | 1-5 | 90% | pass |
| 2# adhesive | 2-1 | 50% | failure |
| | 2-2 | 60% | failure |
| | 2-3 | 70% | failure |
| | 2-4 | 80% | pass |
| | 2-5 | 90% | pass |
| 3# adhesive | 3-1 | 50% | failure |
| | 3-2 | 60% | failure |
| | 3-3 | 70% | failure |
| | 3-4 | 80% | failure |
| | 3-5 | 90% | failure |

For the five test groups (i.e., 1-1, 1-2, 1-3, 1-4 and 1-5) formed by 1# adhesive, according to Table S-1, the average value of $\sigma_1$ was 11.87 MPa, the average value of $\sigma_2$ was 1.52 MPa. According to Table S-2, when $A_1/A$ was equal to 50%, $$\frac{A-A_1}{A} \cdot 1.52 + \frac{A_1}{A} \cdot 11.87 = 6.695 < 7.2 \ Mpa,$$

the failure of the battery box occurred under impact, that was, the battery box did not pass the mechanical impact test; and when $A_1/A$ was equal to or more than 60%, $$\frac{A-A_1}{A} \cdot 1.52 + \frac{A_1}{A} \cdot 11.87 > 7.2 \ Mpa,$$

the failure of the battery box did not occur under impact, that was the battery box passed the mechanical impact test.

For the five test groups (i.e., 2-1, 2-2, 2-3, 2-4 and 2-5) formed by 2# adhesive, according to Table S-1, the average value of $\sigma_1$ was 9.59 MP, the average value of $\sigma_2$ was 1.52 MPa. According to Table S-2, when $A_1/A$ was no greater than 70%, $$\frac{A-A_1}{A} \cdot 1.52 + \frac{A_1}{A} \cdot 9.59 < 7.2 \ Mpa,$$

the failure of the battery box occurred under impact, that was the battery box did not pass the mechanical impact test; and when $A_1/A$ was equal to or more than 80%, $$\frac{A-A_1}{A} \cdot 1.52 + \frac{A_1}{A} \cdot 9.59 > 7.2 \ Mpa,$$

the failure of the battery box did not occur under impact, that was the battery box passed the mechanical impact test.

For the five test groups (i.e., 3-1, 3-2, 3-3, 3-4 and 3-5) formed by 3# adhesive numbered 3, according to Table S-1, the average value of $\sigma_1$ was 7 MPa, the average value of $\sigma_2$ was 1.52 mPa. According to Table S-2, when $A_1/A$ was equal to or more than 50%, $$\frac{A-A_1}{A} \cdot 1.52 + \frac{A_1}{A} \cdot 7 < 7.2 \ Mpa,$$

the failure of the battery box occurred under impact, that was the battery box did not pass the mechanical impact test.

What is claimed is:

1. A battery box, comprising:
   a box body;
   a plurality of batteries arranged side by side in a longitudinal direction and accommodated in the box body, and each battery comprising a case;
   an insulating film covering and fixed to an outside of the case of each battery, and an opening being provided on the insulating film to make a corresponding portion of the case expose to the insulating film; and
   an adhesive provided between the battery and the box body and used to fix each battery to the box body;
   wherein
   a bonding strength of the case of the battery bonded to the box body by the adhesive is $\sigma_1$, a bonding strength of the insulating film bonded to the box body by the adhesive is $\sigma_2$, an area of the opening of the insulating film is $A_1$, a total area of a surface of the case on a side corresponding to the opening is A, and $\sigma_1$, $\sigma_2$, $A_1$ and A meet a following relationship:

$$\frac{A-A_1}{A} \cdot \sigma_2 + \frac{A_1}{A} \cdot \sigma_1 \geq 7.2 \ Mpa.$$

2. The battery box according to claim 1, wherein $$\frac{A-A_1}{A} \cdot \sigma_2 + \frac{A_1}{A} \cdot \sigma_1 \geq 7.7 \ Mpa.$$

3. The battery box according to claim 1, wherein $A_1$ and A need to meet the relationship: $A_1/A > 50\%$.

4. The battery box according to claim 1, wherein $A_1/A \leq 70\%$.

5. The battery box according to claim 1, wherein
the insulating film is made of polypropylene, polycarbonate or polyethylene terephthalate;
the bonding strength of the insulating film bonded to the box body by the adhesive $\sigma_2$ is no more than 1.8 Mpa.

6. The battery box according to claim 1, wherein
the case of the battery is made of aluminum;
the bonding strength of the case of the battery bonded to the box body by the adhesive $\sigma_1$ is no less than 9 Mpa.

7. The battery box according to claim 1, wherein the material of the adhesive is a one-component polyurethane or a two-component polyurethane.

8. The battery box according to claim 1, wherein the material of the adhesive is a one-component epoxy resin or a two-component epoxy resin.

9. The battery box according to claim 1, wherein
the case of each battery comprises a bottom face;
the opening is positioned below the bottom face of the case in an up-down direction and makes a part of the bottom face of the case expose to the insulating film.

10. The battery box according to claim 1, wherein
the case of each battery comprises a side face;
the opening is positioned outside the side face of the case in a transversal direction and makes a part of the side face of the case expose to the insulating film.

11. A vehicle, comprising a battery box, wherein
the battery box comprises a box body, a plurality of batteries, an insulating film and an adhesive;
the plurality of batteries is arranged side by side in a longitudinal direction and accommodated in the box body, and each battery comprising a case;
the insulating film covers and is fixed to an outside of the case of each battery, and an opening is provided on the insulating film to make a corresponding portion of the case expose to the insulating film;
the adhesive is provided between the battery and the box body and used to fix each battery to the box body;
wherein a bonding strength of the case of the battery bonded to the box body by the adhesive is $\sigma_1$, a bonding strength of the insulating film bonded to the box body by the adhesive is $\sigma_2$, an area of the opening of the insulating film is $A_1$, a total area of a surface of the case on a side corresponding to the opening is A, and $\sigma_1$, $\sigma_2$, $A_1$ and A meet a following relationship:

$$\frac{A - A_1}{A} \cdot \sigma_2 + \frac{A_1}{A} \cdot \sigma_1 \geq 7.2 \ Mpa.$$

12. The vehicle according to claim 11, wherein $$\frac{A - A_1}{A} \cdot \sigma_2 + \frac{A_1}{A} \cdot \sigma_1 \geq 7.7 \ Mpa.$$

13. The vehicle according to claim 11, wherein $A_1$ and A need to meet the relationship: $A_1/A > 50\%$.

14. The vehicle according to claim 11, wherein $A_1/A \leq 70\%$.

15. The vehicle according to claim 11, wherein
the insulating film is made of polypropylene, polycarbonate or polyethylene terephthalate;
the bonding strength of the insulating film bonded to the box body by the adhesive $\sigma_2$ is no more than 1.8 Mpa.

16. The vehicle according to claim 11, wherein
the case of the battery is made of aluminum;
the bonding strength of the case of the battery bonded to the box body by the adhesive $\sigma_1$ is no less than 9 Mpa.

17. The vehicle according to claim 11, wherein the material of the adhesive is a one-component polyurethane or a two-component polyurethane.

18. The vehicle according to claim 11, wherein the material of the adhesive is a one-component epoxy resin or a two-component epoxy resin.

19. The vehicle according to claim 11, wherein
the case of each battery comprises a bottom face;
the opening is positioned below the bottom face of the case in an up-down direction and makes a part of the bottom face of the case expose to the insulating film.

20. The vehicle according to claim 11, wherein
the case of each battery comprises a side face;
the opening is positioned outside the side face of the case in a transversal direction and makes a part of the side face of the case expose to the insulating film.

* * * * *